United States Patent [19]

Brown

[11] Patent Number: 4,615,192
[45] Date of Patent: Oct. 7, 1986

[54] BRAKE LOCKING SYSTEM

[76] Inventor: William B. Brown, 18700 Covello St., Reseda, Calif. 91335

[21] Appl. No.: 633,623

[22] Filed: Jul. 23, 1984

[51] Int. Cl.⁴ .............................................. G05G 5/00
[52] U.S. Cl. ..................................... 70/181; 70/202
[58] Field of Search ................. 70/181, 202, 238, 237, 70/256

[56] References Cited

U.S. PATENT DOCUMENTS 2,015,834 10/1935 Banker .................................. 70/181
2,330,536 9/1943 Zimmermann ......................... 70/181
2,553,753 5/1951 Devor ................................... 70/181
3,508,625 4/1970 Hawkins ............................... 70/181

Primary Examiner—Robert L. Wolfe
Attorney, Agent, or Firm—Allan M. Shapiro

[57] ABSTRACT

Automotive vehicle has a parking brake which is lockable in the brake-on position. In addition, the parking brake interacts with the service brake system of the vehicle to lock the service brake when the parking brake is locked.

19 Claims, 3 Drawing Figures

U.S. Patent  Oct. 7, 1986  4,615,192
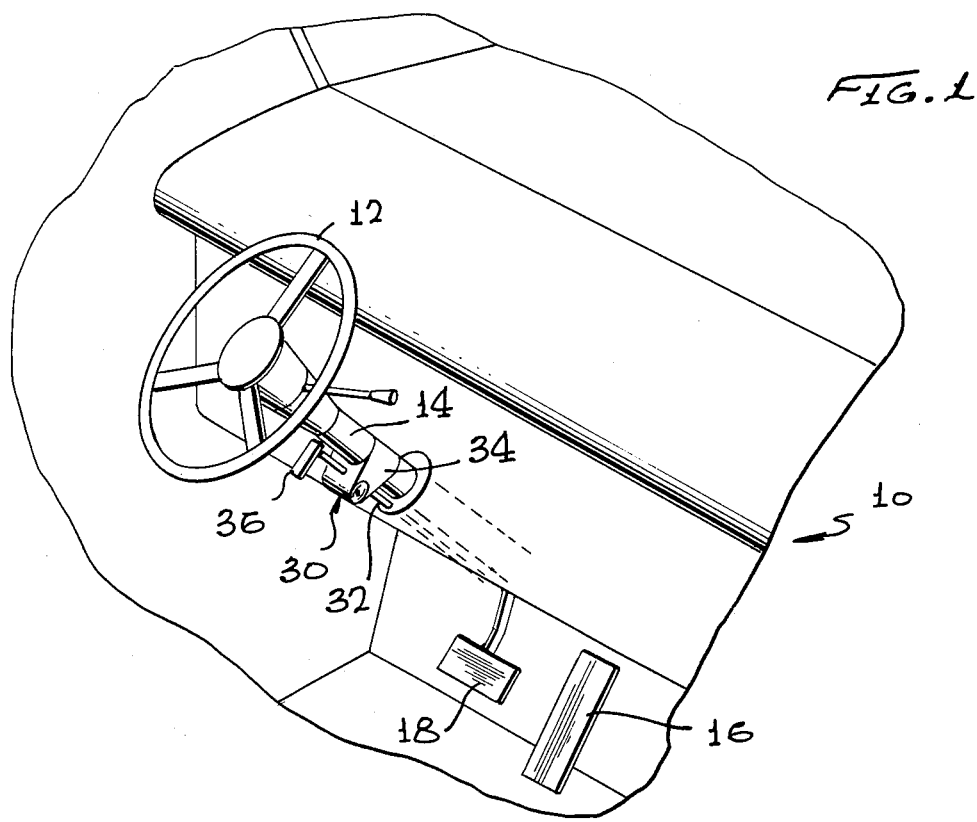
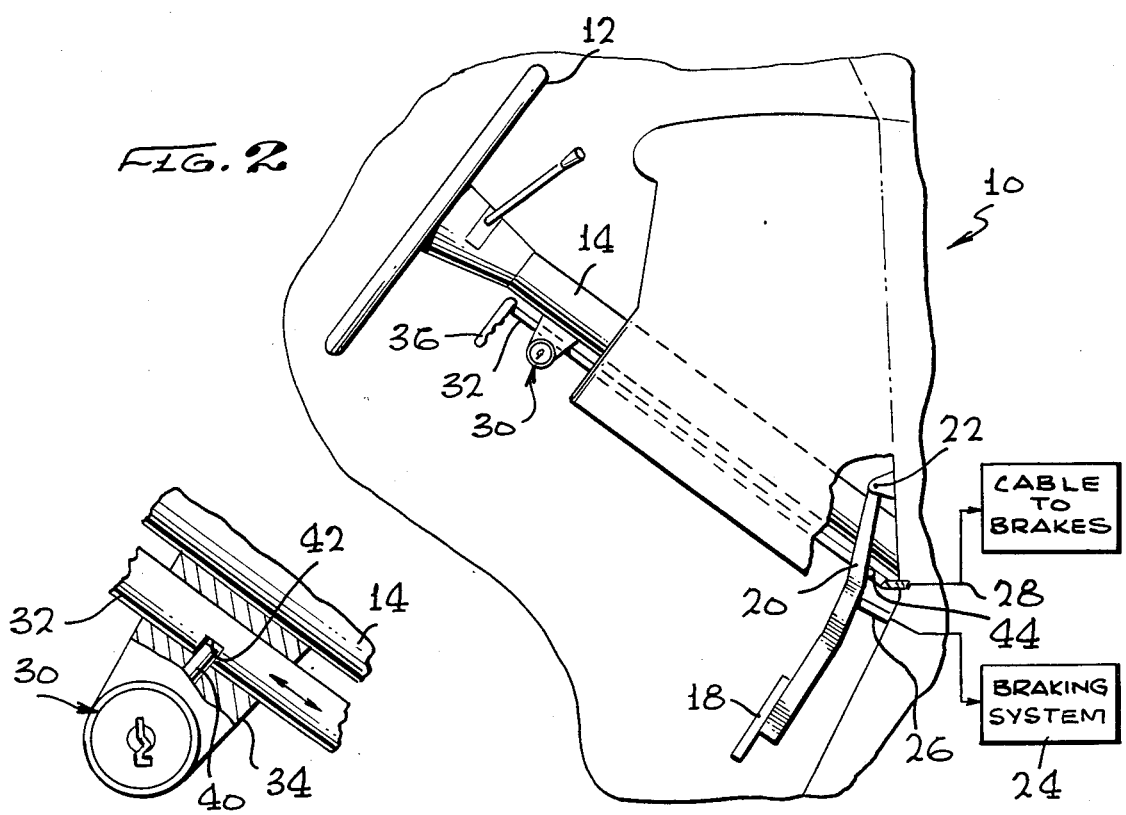

BRAKE LOCKING SYSTEM

BACKGROUND OF THE INVENTION

This invention is directed to a brake locking system which includes a parking brake lock and an interconnection between the parking brake and the service brake so that both are lockable.

Theft of automotive vehicles has engendered a number of different kinds of systems for inhibiting the unauthorized removal of the vehicle. Modern automobiles have a lock which interconnects the ignition and the steering. Without unlocking the steering, theft is inhibited. Another inhibition to unauthorized removal of the vehicle is the locking of the doors of the vehicle. However, the locks on the doors are easily overcome. The lock on the steering and the ignition can also be overcome so that both steering and ignition are operative. Accordingly, theft occurs even though the vehicle is protected by those two locking systems. Therefore, there is need for additional security.

SUMMARY OF THE INVENTION

In order to aid in the understanding of this invention, it can be stated in essentially summary form that it is directed to a brake locking system wherein the parking brake system is connected to a lock so that the parking brake system can be locked in the brake-on position. In addition, brake locking system interacts with the service brakes of the vehicle to lock those brakes when the parking brakes are locked.

It is, thus, an object and advantage of this invention to provide a brake locking system for an automotive vehicle to enhance the security of the automotive vehicle.

It is a further object and advantage of this invention to provide an economic, easily installed and reliable brake locking system so that the system can be readily available to enhance security of the automobile.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of the driver's controls, including the brake locking system of this invention, in an automotive vehicle with parts of the automotive vehicle broken away.

FIG. 2 is a side elevational view thereof.

FIG. 3 is an enlarged side elevational view of the lock portion of the brake locking system, with parts broken away.

DESCRIPTION OF THE PREFERRED EMBODIMENTS

An automotive vehicle 10 is generally indicated in FIGS. 1 and 2, and the parts away from the driver's position are broken away. The vehicle 10 may be a passenger automobile or may be a truck for carrying goods. It has a driver's position which includes the usual controls. Steering wheel 12 is mounted on steering column 14. A steering shaft is turned by the steering wheel and is connected to the ground wheels which are steerable. Steering column 14 is a strongly secured part of the vehicle. In addition to the steering equipment, the driver's position has an accelerator which controls the delivery of power by the engine. Brake pedal 18 is also accessible from the driver's position.

As is seen in FIG. 2, brake pedal 18 is mounted on brake arm 20 which, in turn, is pivoted with respect to the frame on brake pivot pin 22. The service braking system 24 has a plunger 26 which actuates the service brake. The plunger 26 is connected to be operated by brake arm 20. Thus, pressing down upon brake pedal 18 rotates arm 20 about its pivot 24 and thrusts down plunger 26. This thrusting down of the plunger actuates the brakes on the service braking system. The service braking system may be a hydraulic system, or a boosted hydraulic system, as found in passenger automobiles and light trucks. However, the braking system 24 could also be an air-operated braking system such as is found in heavier trucks.

The automotive vehicle 10 also has a cable system for actuating at least some of the brakes. Such cable systems used to be called "emergency brakes," and now are used to hold the vehicle while it is parked. The brake cable is indicated at 28. For actuation, such cables are conventionally connected to auxiliary foot pedals or hand-operated levers.

In accordance with this invention, the brake locking system 30 includes an operating rod 32 which is constrained to longitudinal movement along its own axis. At its upper end, operating rod 32 passes through lock body 34, as is seen in FIGS. 1, 2 and 3. At its upper end, operating rod 32 carries handle 36 which is positioned and sized for convenient manual pulling. At its lower end, operating rod 32 is connected to cable 28. When the handle 36 is pulled, operating rod 32 moves along the length of the steering column toward the driver and tensions the cable to the parking brakes, thus locking the wheels to which the parking brakes are applied. The operating rod can be locked in this position. Lock 38 has a sear 40 which can be extended into the active position shown in FIG. 3 by actuation of lock 38. With the handle 36 pulled and the cable-actuated brakes engaged, notch 42 is in alignment with the sear so that the sear holds the operating rod and the cable-actuated brakes in the brake-on position. Since lock body 34 is securely mounted to the steering column, security of the brake-on condition is assured.

In addition to this security, crosspin 44 is positioned transverse through the lower end of operating rod 32 beneath brake arm 20. The structure is sized so that when the operating rod is pulled to the locked position shown in FIGS. 2 and 3, crosspin 44 prevents the actuation of the service brakes. Thus, even though the effectiveness of the brake locking system 30 is reduced by disabling the parking brakes, such as by cutting the brake cable, the brake locking system continues to provide protection for the car. So long as the service brake system cannot be used, the vehicle will not be removed by a judicious person. Thus, the brake parking system of this invention locks the brakes in two ways. The brake locking system can readily be deactuated by use of a key in lock 38. This releases sear 40 from notch 42 to permit forward and downward movement of the operating rod. Such movement releases the cable operated brakes and permits actuation of the service brakes. In this way, an authorized user can readily utilize his vehicle.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A brake locking system for an automotive vehicle having a steering column, parking brakes operated by a cable, and brake pedal-operated service brakes, comprising:
   operating means for operating the brake locking system, said operating means being for connection to the cable of the parking brakes so that, when said operating means is moved from a first to a second position, the cable is tensioned to apply the parking brakes;
   a lock associated with said operating means to lock said operating means in its second position; and
   cooperative means connected to said operating means, said cooperative means being for interacting with the service brakes of the automotive vehicle to also lock the service brakes when said operating means is locked in its second position.

2. The brake locking system of claim 1 wherein said operating means is an operating rod.

3. The brake locking system of claim 2 wherein there is a body on said operating rod, said body being for securement to the steering column of the automotive vehicle, said operating rod being slidable within said body from its first to its second position.

4. The brake locking system of claim 3 wherein said body has said lock means therein.

5. The brake locking system of claim 4 wherein said lock means comprises a sear operated by a key, said sear engaging in a notch in said operating rod when said operating rod is in its second position.

6. The brake locking system of claim 5 wherein there is a manually engageable handle on said locking rod for positioning so that a user can pull said handle and said operating rod from said first position to said second position.

7. A brake locking system for an automotive vehicle having a steering column, parking brakes operated by a cable, and brake pedal-operated service brakes, comprising:
   an operating rod, said operating rod having an upper end and a lower end and being for positioning adjacent the steering column, said operating rod being movable from a first position to a second position, said lower end of said operating rod being connectable to the cable of the cable-operated parking brakes so that, when said operating rod is in its first position, the parking brakes are free and, when said operating rod is in its second position, said parking brakes are engaged;
   means for locking said operating rod in its second position; and
   means on said operating rod for interengagement with the service brakes of the automotive vehicle for locking the service brakes of the automotive vehicle when said operating rod is locked in its second position.

8. The brake locking system of claim 7 wherein there is a manually operated handle on said operating rod for manually moving said operating rod from its first position or its second position.

9. The brake locking system of claim 7 wherein said locking means including a lock body, said lock body being for securement to the steering column of an automotive vehicle, said operating rod being movable through said lock body from said first position to said second position.

10. The brake locking system of claim 9 wherein said operating rod has a notch therein and said lock body has a sear therein, said sear engaging said notch when said operating rod is in its second position.

11. The brake locking system of claim 10 wherein there is a lock in said lock body, said lock being connected to said sear to withdraw said sear for unlocking said operating rod.

12. The brake locking system of claim 11 wherein there is a manually operated handle on said operating rod for manually moving said operating rod from its first position or its second position.

13. The brake locking system of claim 7 wherein said means engaging the service brakes of the automotive vehicle comprises a pin engaging with the service brake arm for restraining the service brake arm when said operating rod is in its second position.

14. The brake lockding system of claim 13 wherein said pin is for engagement beneath the brake arm so that when said operating rod is in its second position, the service brakes of the automotive vehicle are restrained from operation by the pin.

15. The brake locking system of claim 14 wherein said locking means includes a lock body, said lock body being for securement to the steering column of an automotive vehicle, said operating rod being movable through said lock body from said first position to said second position.

16. The brake locking system of claim 15 wherein said operating rod has a notch therein and said lock body has a sear therein, said sear engaging said notch when said operating rod is in its second position.

17. A brake locking system in combination with an automotive vehicle, comprising:
   said automotive vehicle having a steering column, cable-operated parking brakes and brake pedal-operated service brakes, said service brakes including a brake arm, the improvement comprising:
   an operating rod movably mounted on said steering column from a first position to a second position, a body mounted on said steering column, said operating rod being longitudinally movable through said body, said body having a lock and a sear therein and said operating rod having a notch engageable by said sear when said operating rod is in its second position;
   a connector connecting the cable of said cable-operated brakes to said operating rod so that when said operating rod is in its first condition, said cable-operated brakes are not engaged and when said operating rod is in its second position, said cable-operated brakes are engaged; and
   means interconnecting said operating rod with said service brakes of said automotive vehicle so that when said operating rod is locked in its second position, said service brakes are locked.

18. The brake locking system of claim 17 wherein there is a handle on said operating rod adjacent its upper end for manual engagement and manual movement of said operating rod from its first position to its second position.

19. The brake locking system of claim 17 wherein said means interengaging with said service brakes of said automotive vehicle comprise a crosspin on said operating rod engaged beneath the brake arm of said service brakes for holding said service brakes in the ineffective position when said operating rod is in its second position.

* * * * *